United States Patent
Yang et al.

(10) Patent No.: US 10,472,952 B2
(45) Date of Patent: Nov. 12, 2019

(54) ARRANGEMENT AND METHOD FOR DEPLOYING DOWNHOLE TOOLS TO LOCATE CASING COLLAR USING XY MAGNETOMETERS

(71) Applicants: Lei Yang, Houston, TX (US); Lei Fang, Katy, TX (US); Derek S. Bale, Cypress, TX (US)

(72) Inventors: Lei Yang, Houston, TX (US); Lei Fang, Katy, TX (US); Derek S. Bale, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 361 days.

(21) Appl. No.: 15/438,964

(22) Filed: Feb. 22, 2017

(65) Prior Publication Data
US 2018/0238166 A1    Aug. 23, 2018

(51) Int. Cl.
*E21B 47/09*     (2012.01)
*G01B 7/00*      (2006.01)

(52) U.S. Cl.
CPC .............................. *E21B 47/0905* (2013.01)

(58) Field of Classification Search
CPC ... G01B 7/00; G01B 7/003; E21B 47/09; E21B 47/0905; G01V 3/00; G01V 3/26; G01V 11/005; G01V 2210/542
See application file for complete search history.

(56) References Cited

U.S. PATENT DOCUMENTS

| | | | |
|---|---|---|---|
| 3,019,841 A | 2/1962 | Ternow | |
| 4,506,219 A | 3/1985 | Lee | |
| 6,032,739 A * | 3/2000 | Newman | E21B 29/02 166/255.2 |
| 2003/0117134 A1 | 6/2003 | Almaguer | |
| 2005/0279532 A1* | 12/2005 | Ballantyne | E21B 47/12 175/40 |
| 2006/0173626 A1 | 8/2006 | McElhinney | |
| 2012/0303347 A1* | 11/2012 | DiFoggio | G01V 99/00 703/10 |
| 2013/0249705 A1 | 9/2013 | Sharp et al. | |
| 2015/0025805 A1 | 1/2015 | Hanak et al. | |
| 2015/0167414 A1 | 6/2015 | Coles et al. | |
| 2019/0032480 A1* | 1/2019 | Capoglu | E21B 47/082 |

OTHER PUBLICATIONS

PCT International Search Report and Written Opinion; International Application No. PCT/US2018/014208; International Filing Date: Jan. 18, 2018; dated Jun. 18, 2018; pp. 1-11.

* cited by examiner

*Primary Examiner* — Son T Le
(74) *Attorney, Agent, or Firm* — Cantor Colburn LLP

(57) ABSTRACT

A method and apparatus for locating a collar of a casing of a wellbore is disclosed. A sensor for measuring a magnetic field is conveyed through the casing on a tool string. A physical model is formed of a process of obtaining a magnetic measurement of the casing with the sensor. A simulation of the physical model is run through a processor to select a design parameter of the tool that allows for using the sensor at a determined value of an operational parameter for obtaining the measurement at a selected signal-to-noise ratio. The tool is conveyed into the wellbore and the sensor set to the determined value of the operational parameter. The magnetic measurement of the casing is obtained using the sensor, and the collar is located using the obtained magnetic measurement.

16 Claims, 11 Drawing Sheets

ARRANGEMENT AND METHOD FOR DEPLOYING DOWNHOLE TOOLS TO LOCATE CASING COLLAR USING XY MAGNETOMETERS

BACKGROUND

1. Field of the Disclosure

The present invention relates to a method and apparatus for locating a collar of a casing disposed in a wellbore and, in particular, to a method and apparatus for improving a quality of collar-induced magnetic field measurements obtained by magnetometers conveyed in the casing based on a physical model of a data acquisition process.

2. Background of the Art

In oil exploration, once a wellbore has been drilled to a desired depth, a casing can be formed therein to stabilize the wellbore and to prepare the wellbore for subsequent processes, such as hydrocarbon retrieval and oil production. A casing in a wellbore includes multiple casing tubulars fastened end to end by casing joints or casing collars. Once the casing is set in the wellbore, knowing the location of a collar or casing joint allows one to successfully perform various operations downhole. For example, determining the location of the casing joint may be useful for section milling and to accurately place whipstocks in a cased well so that drilling through the casing joint can be avoided.

One method of locating a casing joint is based on detecting a magnetic signature of the casing. While some casing tubulars are either de-magnetized or are made of soft magnetic materials that do not retain a magnetic field, such tubulars do nonetheless become magnetized in the presence of a magnetic field, such as the earth's magnetic field. For such tubulars, the collar can be located by detecting the effect of the presence of the casing joint on this induced magnetic field. However, various parameters such as wellbore configuration and tool string configuration can affect the quality of magnetic measurements. Accordingly, there is a need to identify and implement tool string configurations that provide improved measurements of the magnetic field as well as to control downhole parameters that affect such measurements.

SUMMARY OF THE DISCLOSURE

In one aspect the present disclosure provides a method of locating a collar of a casing of a wellbore, the method including: forming a physical model of a process of obtaining a magnetic measurement of the casing with a sensor conveyed in the wellbore; running a simulation of the physical model to select a design parameter of a tool that includes the sensor, wherein the design parameter of the tool allows for using the sensor at a determined value of an operational parameter for obtaining the measurement at a selected signal-to-noise ratio; conveying the tool in the wellbore; setting the sensor at the determined value of the operational parameter; obtaining the magnetic measurement of the casing using the sensor; and locating the collar using the obtained magnetic measurement.

In another aspect, the present disclosure provides an apparatus for locating a collar of a casing in a wellbore, the apparatus including: a tool string for conveying a sensor through the casing; wherein the sensor is configured to measure a magnetic field; and a processor configured to: form a physical model of a process of obtaining a magnetic measurement of the casing with the sensor, determine, from the physical model, a value of a parameter of the sensor that enables the sensor to obtain a measurement having a selected signal-to-noise ratio, set the parameter of the sensor to the determined value, obtain the magnetic measurement of the casing using the sensor, and locate the collar using the obtained magnetic measurement.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The disclosure herein is best understood with reference to the accompanying figures in which like numerals have generally been assigned to like elements and in which.

DESCRIPTION OF THE EMBODIMENTS

Figure 1:
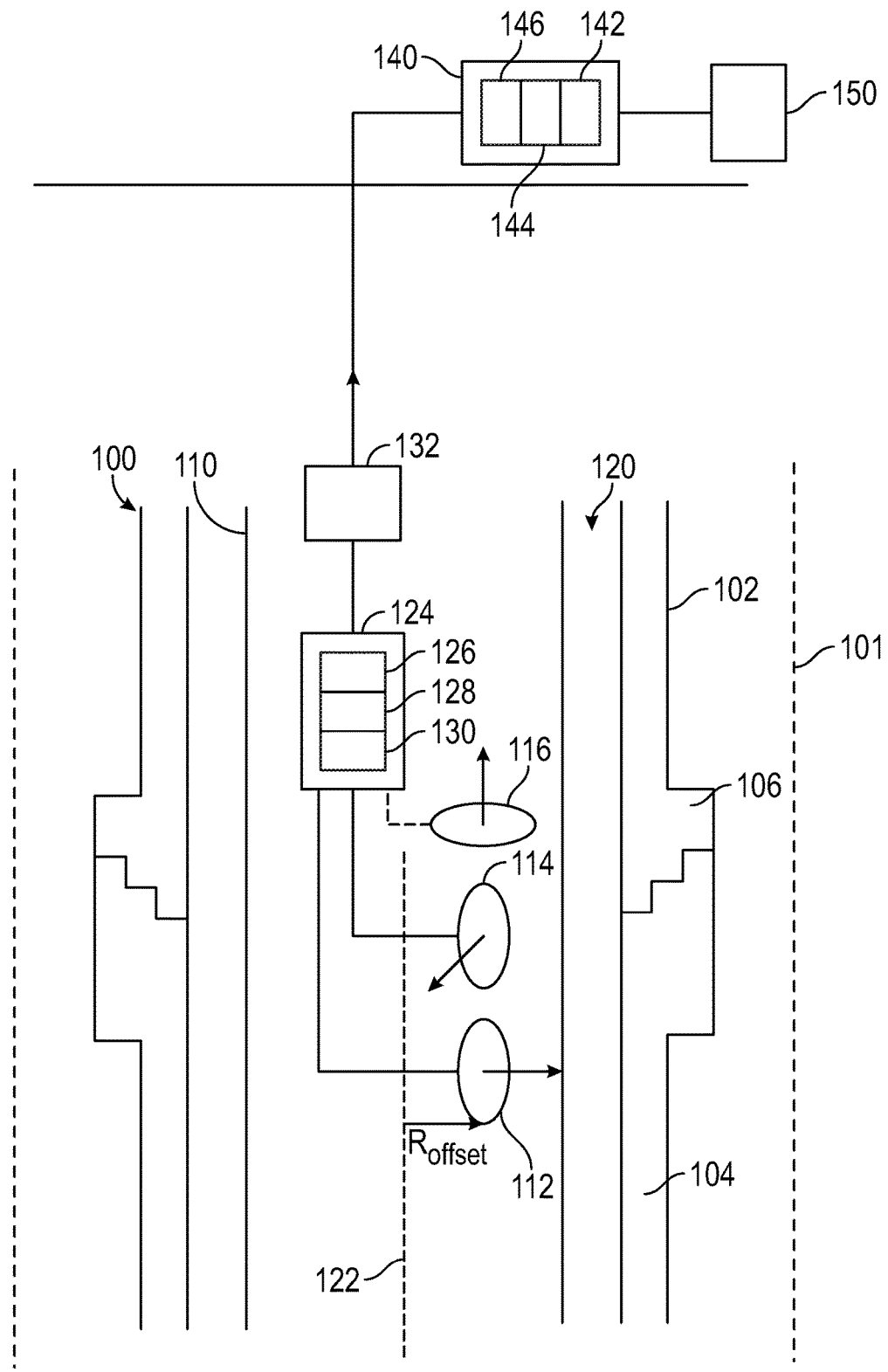
FIG. 1 shows a downhole tool that may be used to determine a location of a collar or casing joint of a wellbore casing in a wellbore in an exemplary embodiment of the present disclosure.

FIG. 1 shows a downhole tool 110 that may be used to determine a location of a collar or casing joint of a wellbore casing 100 in a wellbore 101 in an exemplary embodiment of the present disclosure. The casing 100 may be an assembly of multiple casing tubulars. An exemplary segment of the casing 100 is shown in FIG. 1 at which a first casing tubular 102 is coupled to a second casing tubular 104. In one embodiment, the first casing tubular 102 is fastened to the second casing tubular 104 via a threaded surface on an exterior surface of the first casing tubular 102 and a threaded surface on an interior surface of the second casing tubular 104. In general, the casing tubulars 102, 104 are substantially identical in shape. Therefore, the inner diameter of the first casing tubular 102 is substantially the same as the inner diameter of the second casing tubular 104 and the outer diameter of the first casing tubular 102 is substantially the same as the outer diameter of the second casing tubular 104. The casing joint or collar 106 forms a region that includes the threaded surfaces of the first and second casing tubulars 102, 104.

The casing joint 106 may come in any number of forms. Flush casing joints have inner and outer diameters that are the same as the inner diameters and outer diameters of the casing tubulars at a location away from the casing joint. Semi-flush casing joints may have an inner diameter that is the same as the inner diameters of the casing tubulars while the outer diameter of the casing joint is greater than the outer diameters of the casing tubulars. Another casing joint may have an inner diameter different than the inner diameters casing tubulars and the outer diameter different than the outer diameters of the casing tubulars. The casing joint 106 shown in FIG. 1 is a semi-flush casing joint.

The casing 100, including the first casing tubular 102 and the second casing tubular 104, may be made of a non-magnetized material or a soft magnetic material that does not carry a residual magnetic field. The material of the casing 100 may be such that having an applied magnetic field proximate the casing induces a magnetic field in the casing and removing the applied magnetic field returns the casing to an unmagnetized state. Thus, while the casing 100 may be in a demagnetized state prior to being inserted into the wellbore 101, in the downhole environment the casing 100 carries a magnetic field induced therein due to the presence of the earth's magnetic field.

In one embodiment, the downhole tool 110 is a magnetic logging tool that is conveyed through an interior region 120 of the casing 100 to obtain magnetic measurements of the casing suitable for determining a location of the casing joint 106. The downhole tool 110 may be a tool conveyed at an end of a work string. In one embodiment the downhole tool 110 is included in a bottomhole assembly (BHA), such as is used in measurement-while-drilling (MWD) or logging-while-drilling (LWD) drilling processes. Thus measurements may be obtained and the location of casing collars may be determined during a drilling process without having to stop or interrupt the drilling process. In alternative embodiments, the downhole tool 110 may be a wireline tool, slickline or coiled tubing conveyed downhole.

Figure 1A:
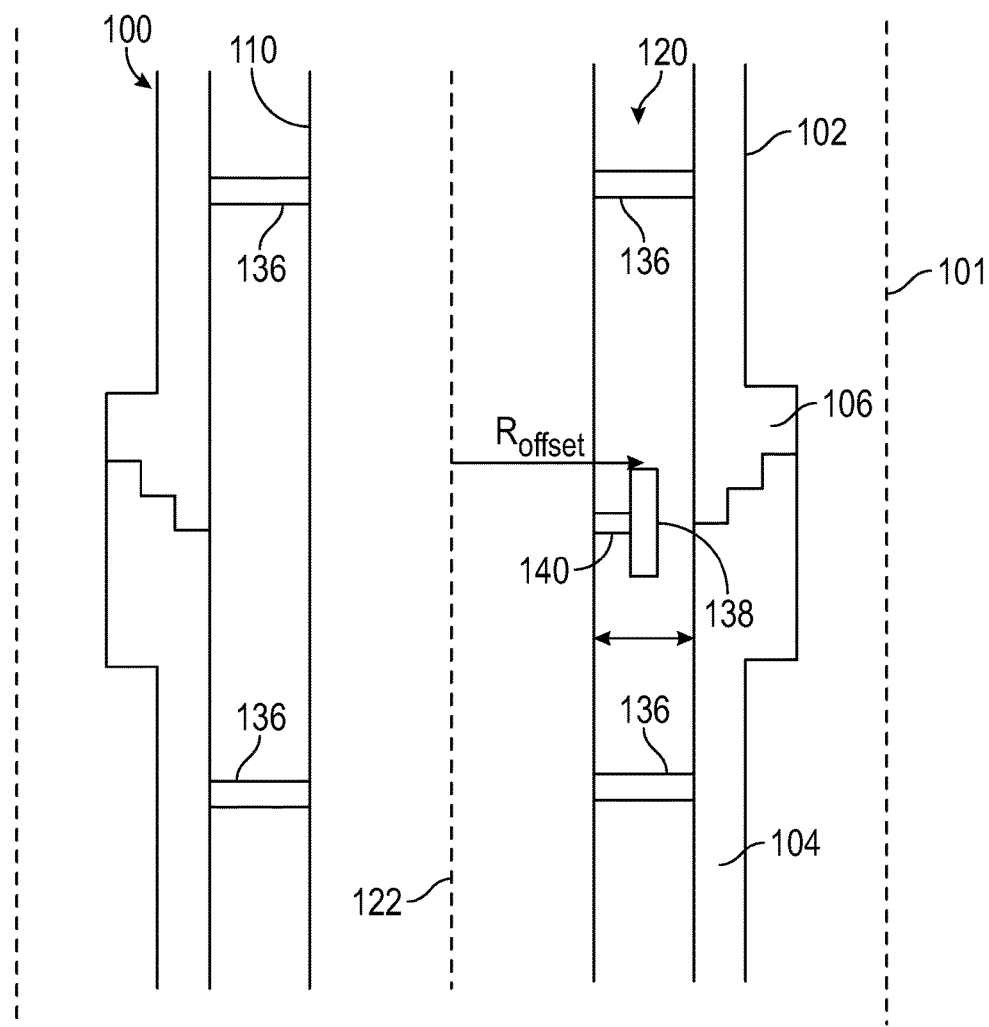
FIG. 1A shows a downhole tool equipped with one or more elements for altering a configuration of the downhole tool within the casing or wellbore.

The downhole tool 110 may be equipped with one or more elements that alter a configuration of the downhole tool 110 within the casing or wellbore 101. Referring to FIG. 1A, the downhole tool 110 may include one or more stabilizers 136 that hold a portion of the downhole tool 110 in place within the casing while magnetic measurements are being obtained. Additionally, the downhole tool 110 may include a pad or member 138 on an extendable arm 140 that can be articulated or extended from a longitudinal axis 122 and/or to a selected distance from an interior face of the casing 100. A sensor such as the magnetometers (112, 114, 116) disposed on the pad or member 138 can thus be placed at a selected radial distance from the longitudinal axis 122. The azimuth or toolface angle can also be changed, generally by rotation of the work string via a motor (not shown) that either at a surface location or downhole.

Referring back to FIG. 1, the exemplary downhole tool 110 includes various sensors suitable for use in locating a casing joint 106 using the methods disclosed herein. In one embodiment, the sensors include a plurality of magnetometers, with each magnetometer having a measurement axis oriented along a tool-based coordinate system of the downhole tool 110. The tool-based coordinate system includes a z-axis oriented parallel to a longitudinal axis 122 of the downhole tool 110 and an x-axis and y-axis oriented orthogonal to the z-axis as well as to each other. The magnetometers therefore include an x-directed magnetometer ($M_x$) 112, y-directed magnetometer ($M_y$) 114, and z-directed magnetometer ($M_z$) 116. The x-directed magnetometer ($M_x$) 112 and a y-directed magnetometer ($M_y$) 114 are oriented in a plane transverse to the longitudinal axis 122 of the downhole tool 110. The magnetometers may be disposed on member (138, FIG. 1A) and can therefore be situated along the longitudinal axis 122 or extended from the longitudinal axis 122 by a selected offset $R_{offset}$. When articulated from the longitudinal axis, one of magnetometers $M_x$ 112 and $M_y$ 114 may be oriented with its measurement axis directed along a radial line of the casing 100 while the other of the magnetometers $M_x$ 112 and $M_y$ 114 may be oriented with its measurement axis directed in a circumferential direction. While the downhole tool 110 may include z-directed magnetometer $M_z$ 116, determination of casing locations using the methods disclosed herein employs those magnetometers that are oriented orthogonal to the longitudinal axis 122, such as magnetometers $M_x$ 112 and $M_y$ 114. Therefore in one embodiment, the downhole tool 110 includes only the x-direction magnetometer $M_x$ 112 and y-directed magnetometer $M_y$ 114.

The magnetometers (112, 114, 116) of the downhole tool 110 obtain magnetic measurements of the casing 100 as the downhole tool 110 is conveyed through the wellbore 101. The measurements may be individual measurements or in the form of a magnetic log. The magnetometers (112, 114, 116) may by conveyed at a selected running speed, toolface angle, an amount of articulation or radial offset, etc. Measurements made by $M_x$ 112 and $M_y$ 114 may be sent to a processing unit 124 that may include a processor 126, various programs 128 for implementing methods for determining a location of a casing joint 106, and a memory 130 for storing data. In addition, the downhole tool 110 may include a telemetry unit 132 that may be used to transmit data to a surface location and to receive data from a surface location. One or more of the measurements may be sent via the telemetry unit 132 to a processing unit 140 at the surface location that includes processor 142, programs 144 and memory 146 for determining the location of the casing joint 106 using the methods disclosed herein. The results of the processing may be sent to a display 150 for viewing by an operator or user. The processor 142 may determine a quality of measurement and use the quality to change a parameter of the downhole tool 110, as discussed below. Alternatively, the results can be used to change a configuration of the downhole tool, such as the running speed, the toolface angle, the amount of articulation, etc. to improve quality of the magnetometer measurements. Additionally, the results can be used to determine a design specification for the downhole tool 110 for used in subsequent wellbore measurements to increase a quality of the subsequent magnetometer measurements.

Figure 2:
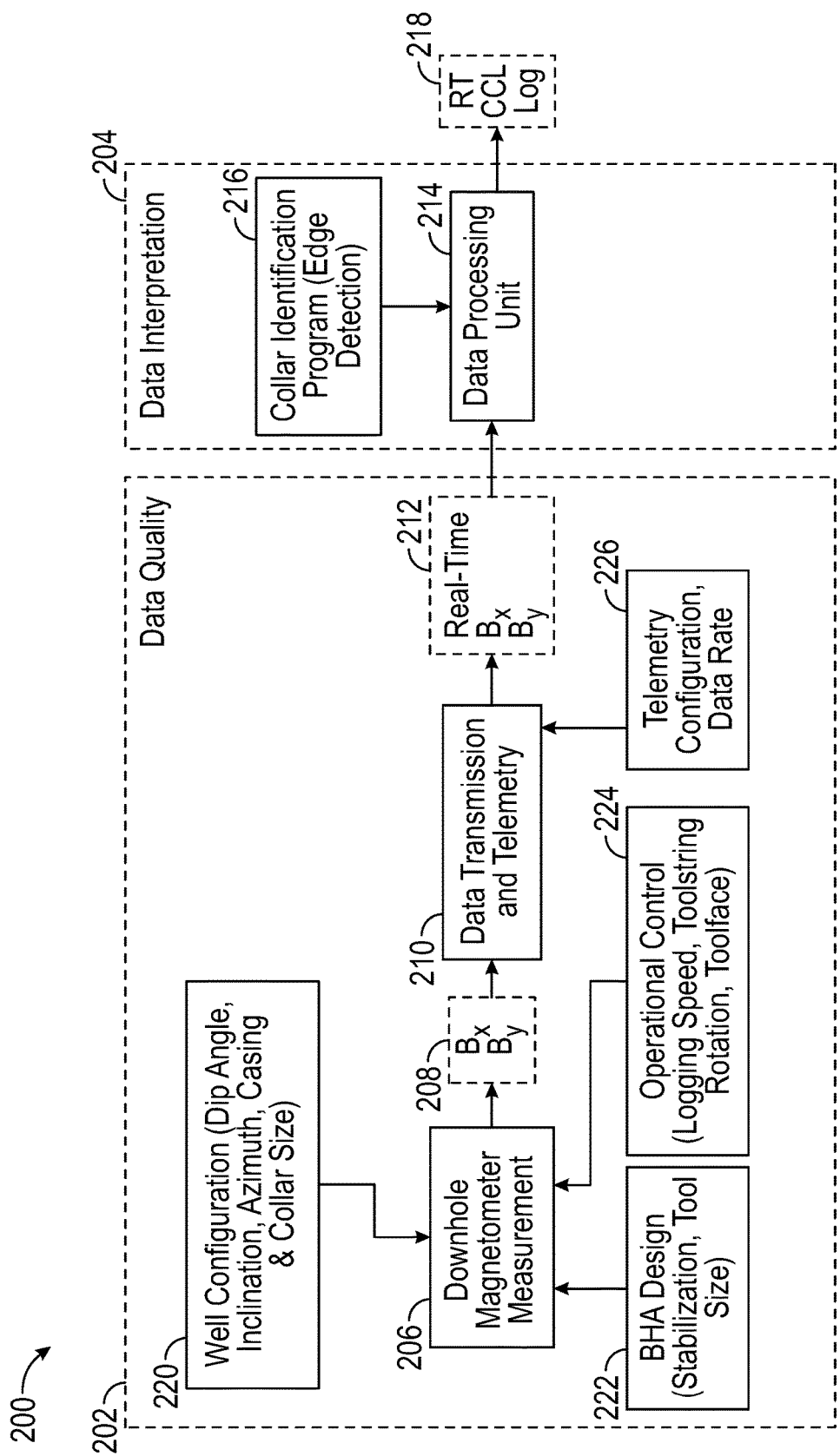
FIG. 2 shows a schematic diagram of a physical model of a process of obtaining magnetic measurements that are usable to determine a location of a collar in a casing.

FIG. 2 shows a schematic diagram 200 of a physical model of a process of obtaining magnetic measurements that are usable to determine a location of a collar in a casing. In one embodiment, the physical model uses the magnetometers (112, 114, 116) of the downhole tool 110. The physical model includes a Data Quality model 202 and a Data Interpretation model 204. The Data Quality model 202 describes the physical parameters and processes for obtaining magnetometer measurements and transmitting the magnetometer measurements to a processor such as a surface processor. The Data Quality model 202 includes a physical model of the wellbore 101 and the downhole tool including such parameters as wellbore configuration parameters 220, BHA design parameters 222, operational control parameters 224 and telemetry parameters 226. These parameters have an effect on the quality of the magnetic measurements and therefore on the ability of the processor to determine the location of a casing collar from the magnetic measurements. Wellbore configuration parameters 220 includes parameters such as a dip angle of the wellbore 101, inclination and azimuth, as well as parameters of the casing, such as the size or thickness of the casing and the size or thickness of the collar. These parameters can change with wellbore trajectory and/or with variations in the casing and/or collar. BHA design parameters 222 includes various design specification of the BHA tool or downhole tool, such as the placement or location of the stabilizers 140 on the downhole tool 110 with respect to the magnetometers $M_x$ 112 and $M_y$ 114, the size of the downhole tool 110, tool sensitivity, etc. Operational control parameters 224 control operation of the magnetometers to obtain the magnetic measurements. Exemplary operational control parameters may include a logging speed or running speed of the downhole tool through the casing, a tool string rotation rate, a tool face angle, magnetometer offset, etc. Telemetry parameters 226 may include, for example, the telemetry configuration, data rate, etc. Whereas the well configuration parameters 220 may generally be out of the control of an operator of the downhole tool, the BHA design parameters can be used to design or select a more effective downhole tool and operational control parameters and telemetry parameters may be changed or altered by an operator or processor in order to improve quality of magnetic measurements during a current logging run and/or for a subsequent logging run.

In the Data Quality model 202, downhole magnetometers 206 are operated in order to obtain magnetometer measurements MagX and MagY 208. As stated earlier, the quality of the magnetometer measurements 208 is determined by the effect well configuration parameters 220, BHA design parameters 222 and operational control parameters 224 have on the downhole magnetometers 206. The MagX and MagY measurements 208 are transmitted via Data Transmission and Telemetry 210 to provide real-time MagX and MagY measurements 212 to data processing unit 214. The real-time MagX and MagY measurements 212 may be individual measurements or in the form of one or more magnetic logs.

The Data Interpretation model 204 describes the process of determining collar location from the magnetometer measurements. The Data Interpretation model 204 includes data processing unit 214 and collar identification programs 216. In one embodiment, the data processing unit 214 may be disposed at a surface location. The data processing unit 214 executes the one or more collar identification programs 216 to determine a location of a collar from one or more magnetic logs 212 obtained using the magnetometers. In one embodiment, the collar identification programs 216 may include various edge detection programs for locating collars based on magnetic signatures and an expected periodic disposition of the collars along the casing. The data processing unit 214 may provide output in the form of a real-time casing locator log 218.

In one embodiment, running the physical model may provide a design parameter of the downhole tool 110, such as a location of stabilizers and a design of the extendable arm of the tool. Additionally, running the physical model can provide an operational parameter for the sensor once the sensor has been conveyed downhole by the downhole tool 110. Additionally, running the physical model may provide both a design parameter and an operational parameter. The values of the design parameters and/or the operational parameters may be associated with a confidence level and/or an expected signal-to-noise ratio. The design parameter and/or the operational parameter for the tool and/or sensor may be selected based on the confidence level and/or expected signal-to-noise ratio.

In another embodiment, results obtained by running the physical model can be used to operate the downhole tool 110 by altering at least one of a BHA design parameter 222, an operational control parameter 224 and/or a telemetry parameter 226 to a parameter setting that increases the quality of magnetometer measurements. The physical model may be run when the downhole tool is already disposed within the borehole. Thus, the physical model may be run so as only to determine the operational parameters using pre-determined design parameters. FIGS. 4-7 illustrate simulated magnetometer measurements obtained by running the physical model at various parameters. These simulated measurements can be used to determine a parameter setting for a downhole tool that improves measurement quality.

Figure 3:
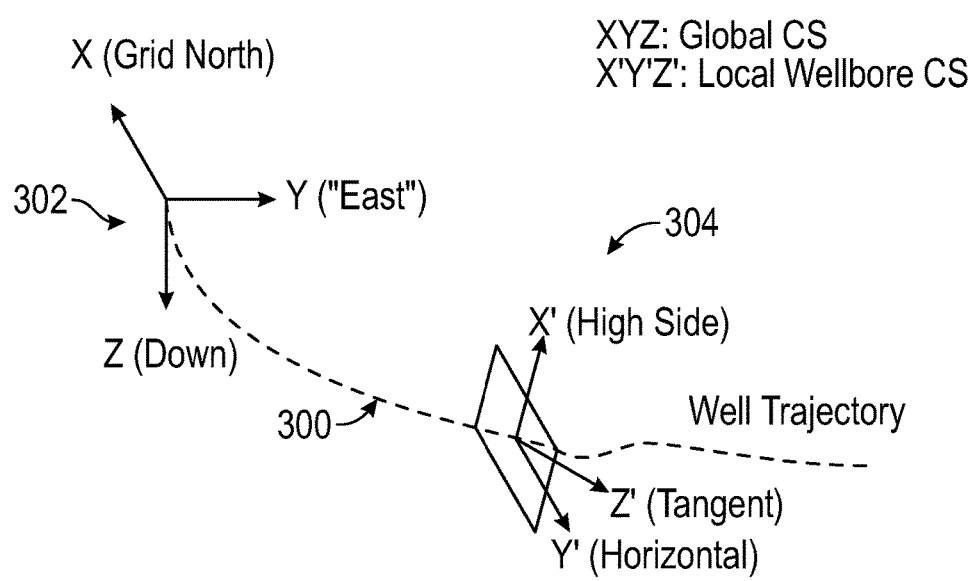
FIG. 3 shows an illustrative trajectory for a wellbore and associated coordinate systems.

FIG. 3 shows an illustrative trajectory for a wellbore 300 and associated coordinate systems. In various embodiments, the wellbore 300 does not remain in a vertical orientation as shown in FIG. 1 but will experience one or more deviations. Coordinate system 302 is a global coordinate system centered on the earth. A z-direction is pointing downward into the earth and x-direction is oriented toward North with the y-direction oriented toward East. As the wellbore 300 is drilled, the original downward or vertical trajectory of the wellbore 300 changes, as can the orientation of the drill string and other parameter such as azimuth (toolface), etc. Coordinate system 304 is a tool-centered coordinate system that includes a z-direction along a local trajectory of the longitudinal axis of the wellbore 300 and x- and y-directions transverse to the local trajectory of the longitudinal axis. The axes of coordinate system 304 can be obtained by adequate transformation of the axes of coordinate system 302. Parameters such as dip angle, inclination angle, azimuth or tool face of the downhole tool in the coordinate system 320 affects the relative orientation of the wellbore 300 with respect to the Earth's magnetic field and therefore the level of magnetization of a casing in the wellbore.

Figure 4:
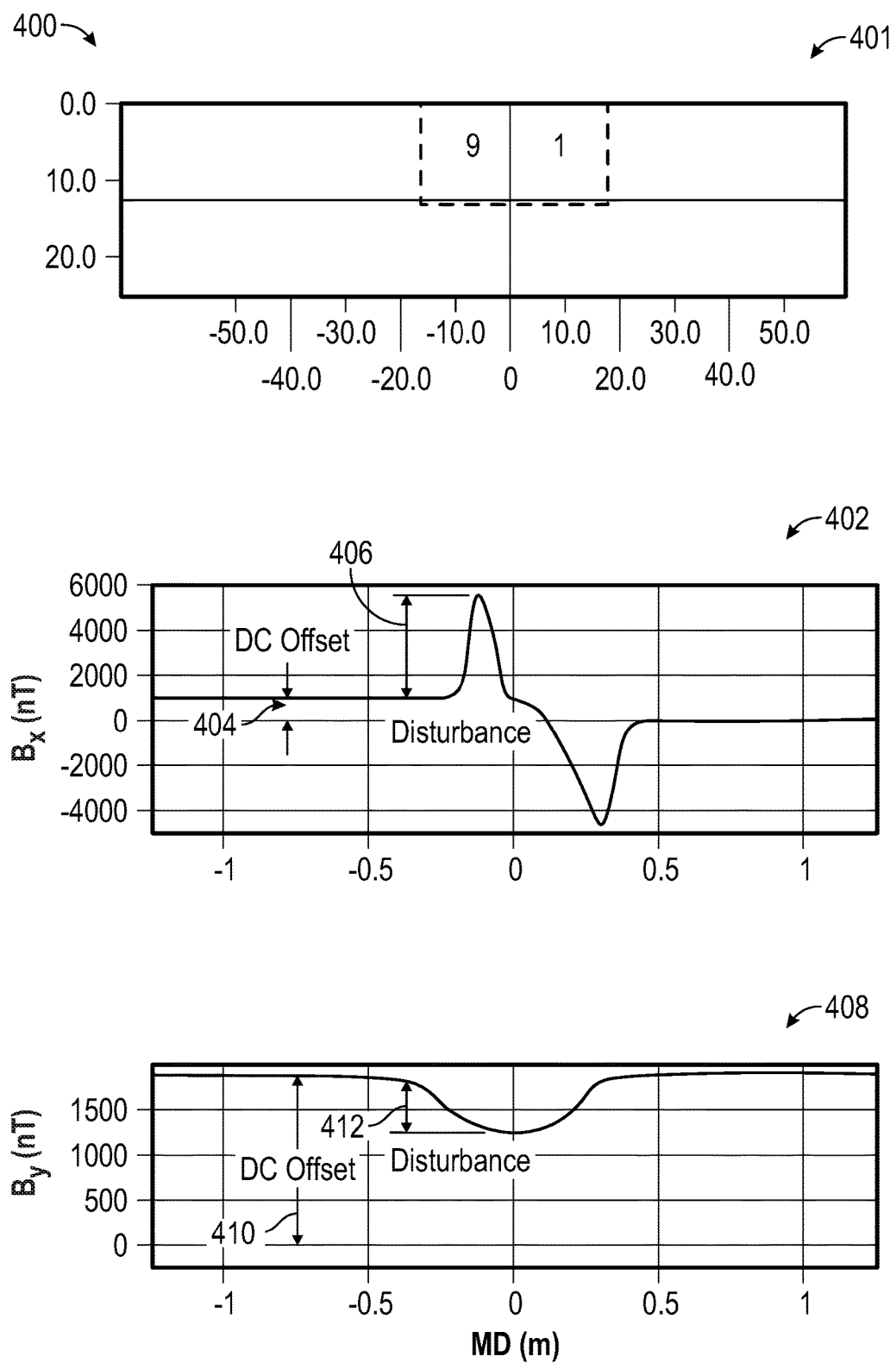
FIG. 4 shows illustrative logs of magnetometer measurements obtained during a logging run of the downhole tool through a section of a casing that includes a collar.

FIG. 4 shows illustrative logs 402, 408 of magnetometer measurements obtained during a logging run of the downhole tool 110 through a section of a casing that includes a collar. For purposes of explanation, a section 401 of an illustrative casing that includes a collar is shown. Magnetic log 402 shows magnetic measurements obtained from $M_x$ 112 during a logging run and magnetic log 408 shows magnetic measurements obtained from $M_y$ 114 during the logging run. As $M_x$ 112 and $M_y$ 114 moves past the collar, the magnetic signature of the collar is recorded on both magnetic logs 402 and 408. Magnetic log 402 displays a constant magnetic field induced within the portion of the casing away from the collar. This constant magnetic field is referred to as a DC-offset 404. Magnetic log 402 also displays a perturbation in the magnetic field at the collar. This collar-induced perturbation is referred to as a disturbance 406 and is characterized by a difference between the DC-offset 404 in the casing region and a peak value of the perturbation resulting from the presence of the collar. For magnetic log 402, the DC-offset 404 has an amplitude of about 1000 nanoTesla (nT) and the disturbance 406 is about 5000 nT. For magnetic log 408, the DC-offset 410 is about 1800 nT and the disturbance 412 is about −600 nT. Since the collar is identified by distinguishing the disturbance from the DC-offset, the ratio of the disturbance to the DC-offset can be considered a signal-to-noise ratio pertinent to determining the quality of magnetic measurements.

Figure 5:
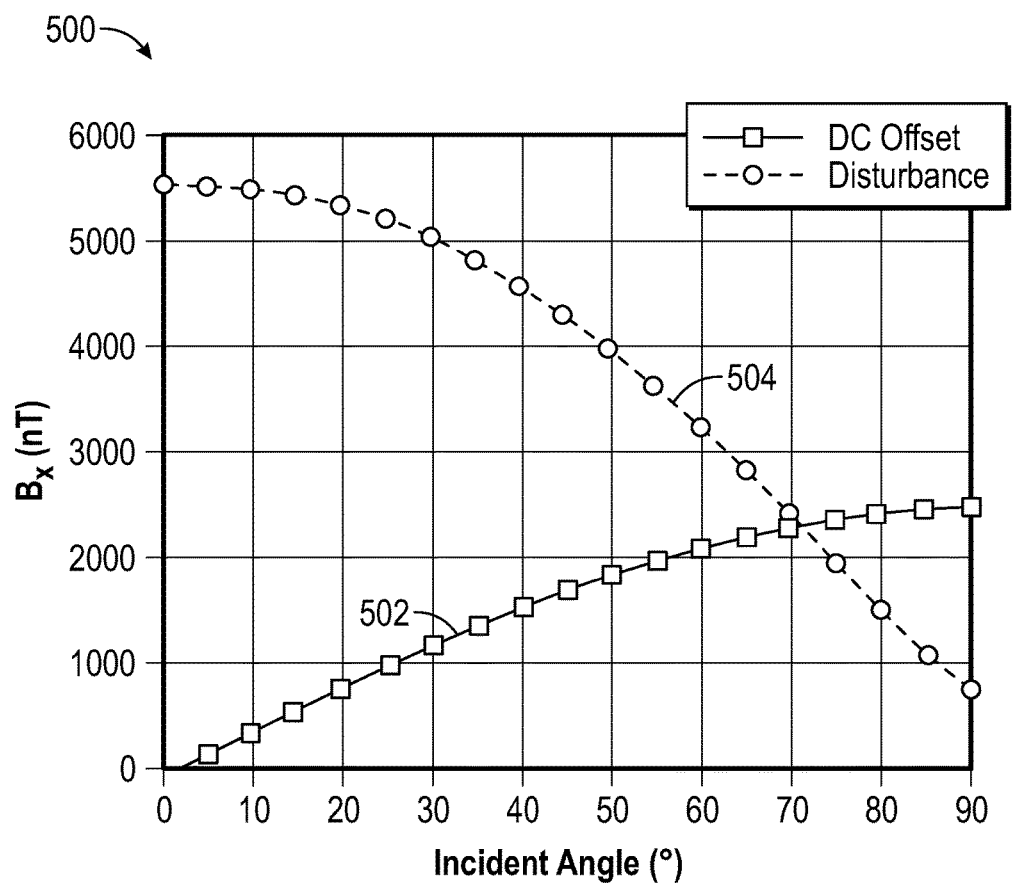
FIG. 5 shows illustrative DC-offset and disturbance measurements obtained by running the physical model at various incident angles of the wellbore with respect to the earth's magnetic field.
Figure 5:
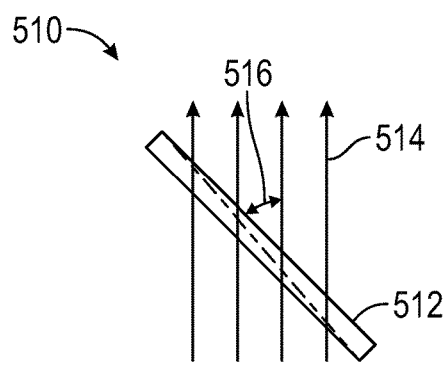

FIG. 5 shows illustrative DC-offset and disturbance measurements obtained by running a simulation of the physical model through a processor for a downhole tool or wellbore at various incident angles of the wellbore with respect to the earth's magnetic field and demonstrates the effects of incident angle on the quality of the magnetometer measurements. The difference between the magnitude of DC offset signals and the magnitude of disturbance signals changes as the angle of incidence of the wellbore varies from vertical. Diagram 510 displays a wellbore 512 inclined with respect to Earth's magnetic field 514 at an incident angle 516. Referring to graph 500, at an incident angle of 0 degrees (i.e., the longitudinal axis of the wellbore is parallel with the Earth's magnetic field), the DC-offset 502 is zero or substantially zero and the disturbance 504 is about 5500 nT. The disturbance 504 is therefore easily distinguishable from the DC-offset 502 at this incident angle. As the incident angle increases (i.e., as the longitudinal axis rotates toward being perpendicular to the earth's magnetic field), the magnitude of the DC-offset 502 increases and the magnitude of the disturbance 504 decreases. At an incident angle of about 70 degrees, the magnitude of the DC-offset 502 is substantially equal to the magnitude of the disturbance 504, making it difficult to distinguish the collar from the casing. It is to be understood that curves for DC-offset 502 and disturbance 504 are only illustrative. The exact form of curves 502 and 504 is dependent of the type and configuration of the downhole tool being used. Understanding the behavior of the DC-offset and disturbance signals with incident angle for a plurality of downhole tools allows one to evaluate the suitability of the downhole tools for a target application as well as a level of confidence for achieving a sufficient quality CCL log using the target application and to thereby select a downhole tool for use downhole based on the level of confidence.

Figure 6A:
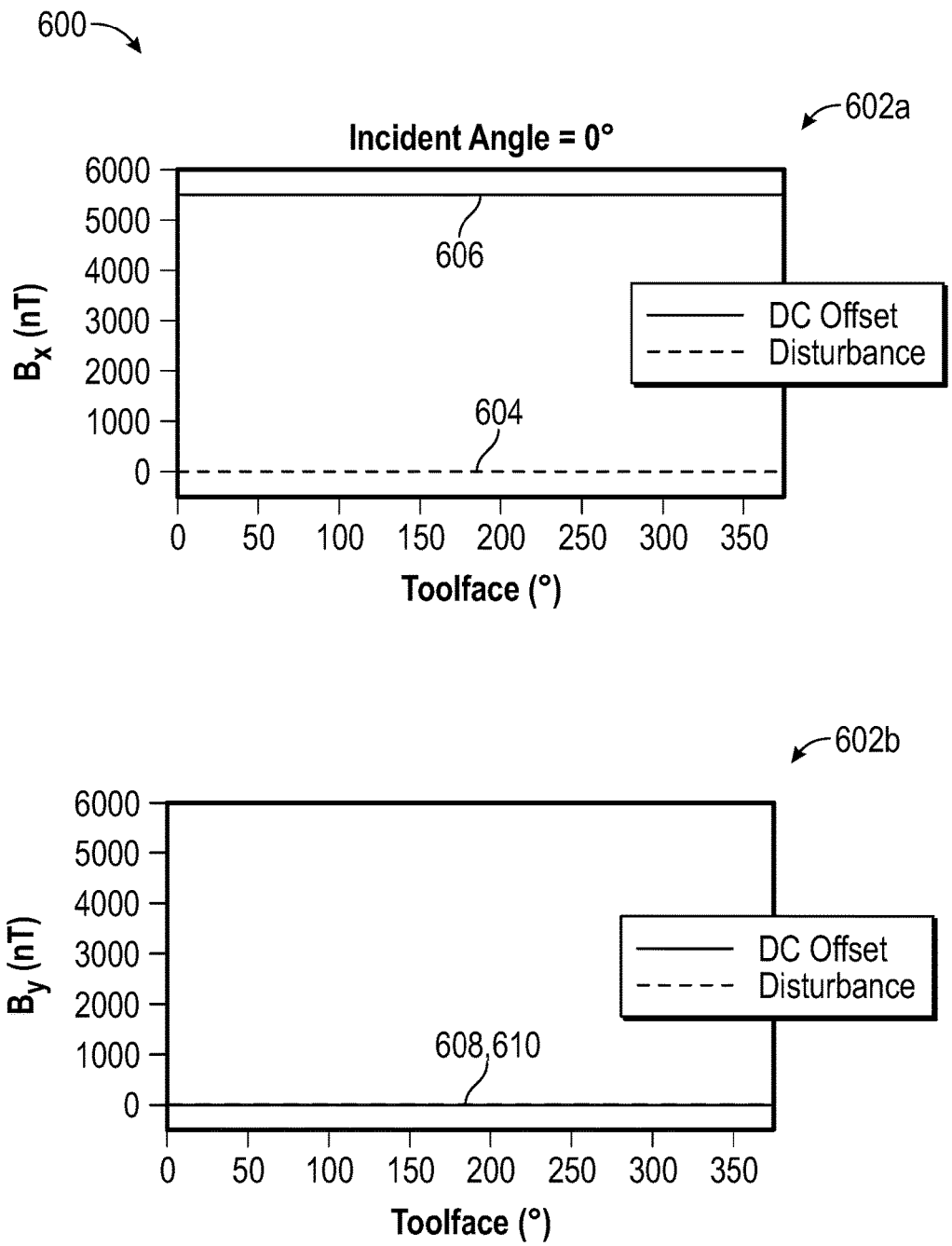
FIG. 6 shows various graphs illustrating an effect of toolface orientation on magnetometer measurements at various incident angles of the wellbore, as obtained by running the physical model.
Figure 6B:
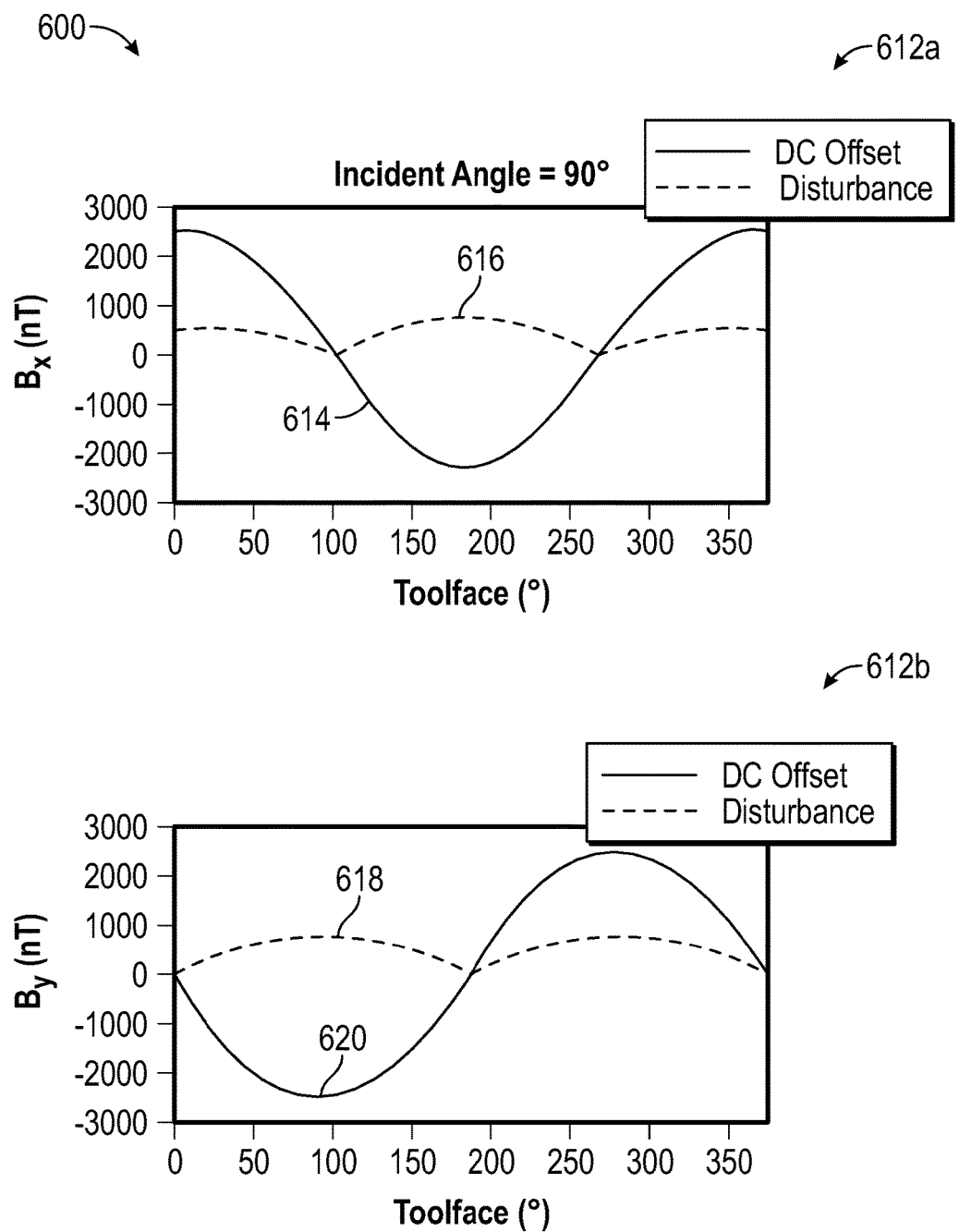

FIG. 6 shows various graphs 600 illustrating an effect of toolface orientation on magnetometer measurements at various incident angles of the wellbore 512, as obtained by running the physical model. Depending on the incident angle of the well, the DC-offset signals and disturbance signals can vary with toolface angle. Thus, depending on the incident angle, different methods can be employed to select a toolface angle that provides a suitable difference between the magnitude of the DC offset signal and the magnitude of the disturbance signal. Each graph displays and example of DC-offset and disturbance measurements for toolface angles spanning from 0 degrees to 360 degrees for their respective magnetometers at their stated incident angles. Toolface angle is shown along the x-axis of the each graph and magnetic field strength is shown along the y-axis of each graph. Graphs 602a and 602b show measured $B_x$ and $B_y$ fields, respectively, with the wellbore 512 at an incident angle of 0 degrees with respect to the Earth's magnetic field 514, i.e., vertical well. In graph 602a ($B_x$-field), the DC-offset 604 remains substantially zero for all toolface angles, while the disturbance 606 remains at a substantially non-zero value for all toolface angles. The disturbance 606 is easily distinguishable from the DC-offset 604. Therefore, the incident angle of 0 degrees provides an optimal signal-to-noise ratio for the $B_x$ field at all tool face angles. In graph 602b ($B_y$-field) the DC-offset 608 and disturbance 610 are substantially the same value and therefore are difficult to distinguish from each other, indicating that $B_y$-field measurements are not suitable for collar detection at an incident angle of 0 degrees.

Graphs 612a and 612b shows $B_x$ and $B_y$ field measurements, respectively, obtained in a wellbore 512 that is inclined at an angle of 90 degrees to the Earth's magnetic field 514. In graph 612a, the DC-offset 614 oscillates in the form of a sinusoidal curve having a maximum value at toolface angles of 0 and 360 degrees and a minimum value at a toolface angle of 180 degrees. Meanwhile the disturbance 616 oscillates in the form of connected half-sinusoid curves, with maximum values at toolface angles of 0, 180 and 360 degrees and minimum values at toolface angles of 90 and 270 degrees. Clearly at toolface angles of 90 and 270 degrees, DC-offset 614 and disturbance measurements 616 are difficult to distinguish from each other. However, at toolface angles of 0 and 180 degrees, DC-offset 614 and disturbance measurements 616 can be easily distinguished from each other. From these results, a suitable toolface angle can be selected so that $B_x$ and $B_y$ magnetic field measurements can be obtained with a signal-to-noise ratio that provides suitable data quality. The graphs 600 are provided for illustrative purposes only. The exact form of the curves shown in graphs 600 is dependent upon the configuration and type of downhole tool. Therefore, the downhole tool and its toolface angle may be selected from a comparison of graphs 600 for a plurality of tools.

Figure 7A:
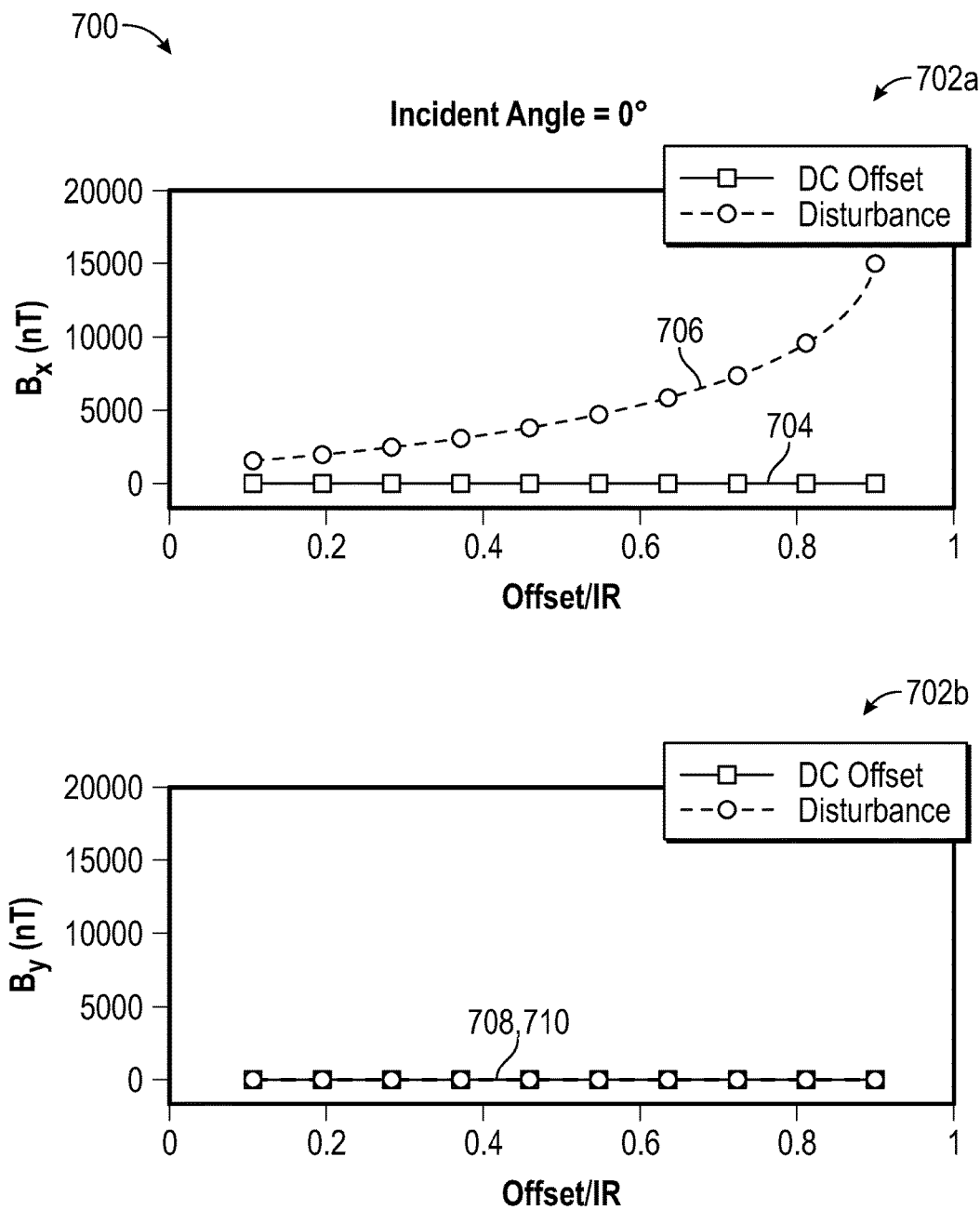
FIG. 7 shows various graphs illustrating an effect of toolface orientation on magnetometer measurements at various incident angles of the wellbore, as obtained by running the physical model.
Figure 7B:
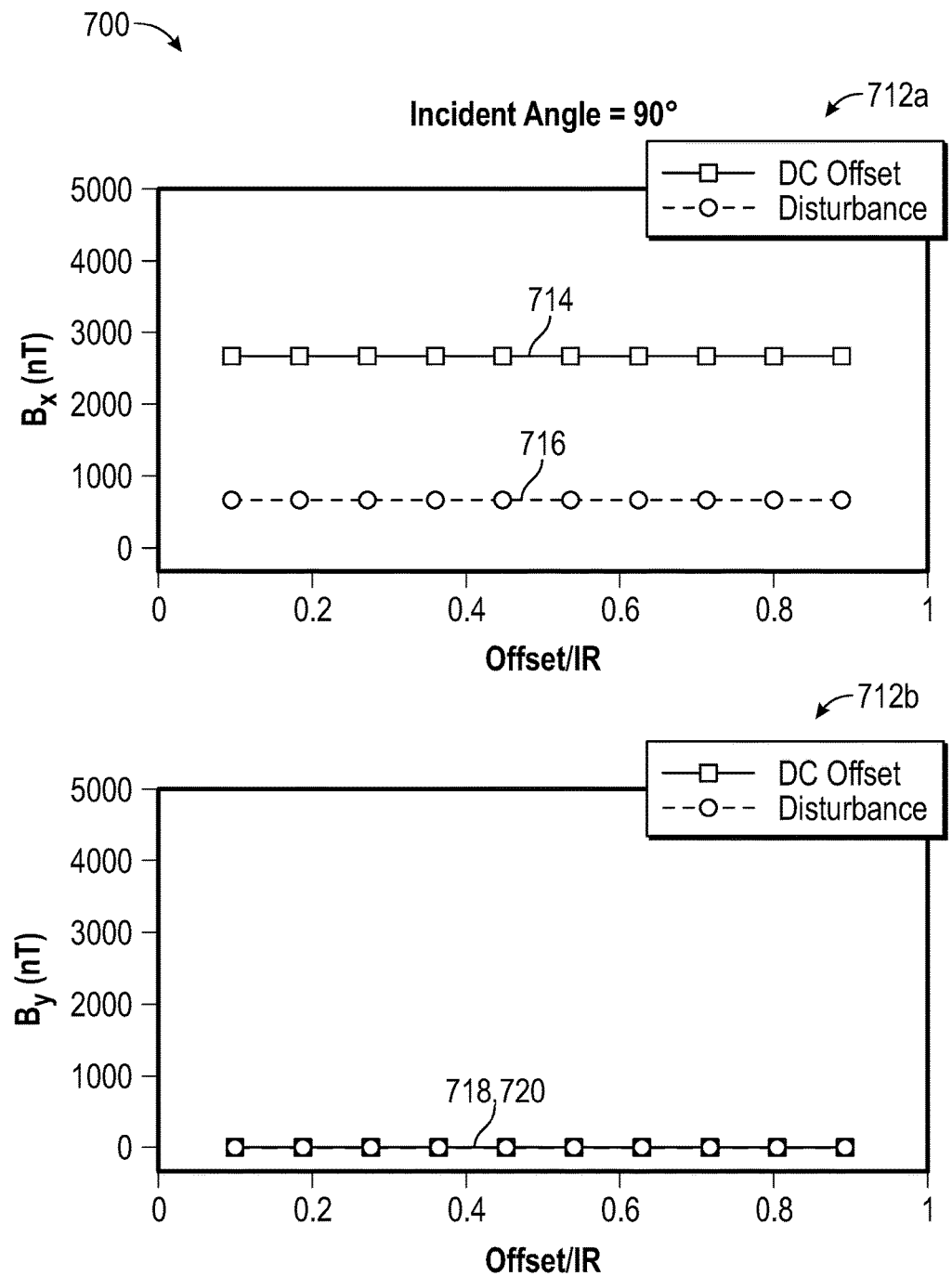

FIG. 7 shows various graphs 700 illustrating an effect of toolface orientation on magnetometer measurements at various incident angles of the wellbore 512, as obtained by running the physical model. Depending on the incident angle, the offset of the sensors can have an impact on the difference between DC offset and disturbance signals. Each graph displays DC-offset and disturbance measurements for a plurality of sensor offsets for their respective magnetometers at their stated incident angles. Sensor offset is shown along the x-axis of each graph and magnetic field strength is shown along the y-axis of each graph. Sensor offset is normalized so that '0' represents the sensor being located along the longitudinal axis of the downhole tool and '1' represents the sensor being located against the casing wall. Graphs 702a and 702b show $B_x$ and $B_y$ field measurements, respectively, with the wellbore at an incident angle of 0 degrees with respect to the Earth's magnetic field, i.e., vertical well). In graph 702a, the DC-offset 704 remains substantially zero for all offset distances, while the disturbance 706 increases as the sensor ($M_x$) is moved away from the longitudinal axis and toward the casing. Therefore for $B_x$ field measurements, the disturbance 706 can be distinguished from the DC-offset 704 by changing or increasing the sensor offset. In graph 702b, the DC-offset 708 and disturbance 710 are substantially the same value at all sensor offsets and therefore the $B_y$ field measurements are relative unaffected by sensor offset. Graphs 712a and 712b shows $B_x$ and $B_y$ field measurements obtained in a wellbore 512 that is inclined at an angle of 90 degrees to the Earth's magnetic field. In graph 712a, the DC-offset 714 remains substantially at a first value for all sensor offsets. Meanwhile the disturbance 716 remains substantially at a second value (different from the first value of the DC-offset 714) for all sensor offsets. While changing the sensor offset does not affect the values DC-offset 714 and disturbance 716, they are distinguishable from each other at any selected sensor offset. In graph 712b, the DC-offset 718 and disturbance 720 for the $B_y$ field are difficult to distinguish from each at any sensor offset value. The results shown in the graphs 700 can be used to select a sensor offset that provides a suitable signal-to-noise ratio for magnetometer measurements. The graphs 700 also show that concentricity of the tool in the wellbore 512 is not essential for obtaining quality measurements. However, stabilizing the tool in the wellbore 512 to maintain a constant sensor offset is useful for providing quality measurements. The graphs 700 are provided for illustrative purposes only. The exact form of the curves shown in graphs 700 is dependent upon the configuration and type of downhole tool. Therefore, the downhole tool and the offset of its sensors may be selected from a comparison of graphs 700 for a plurality of tools.

Figure 8:
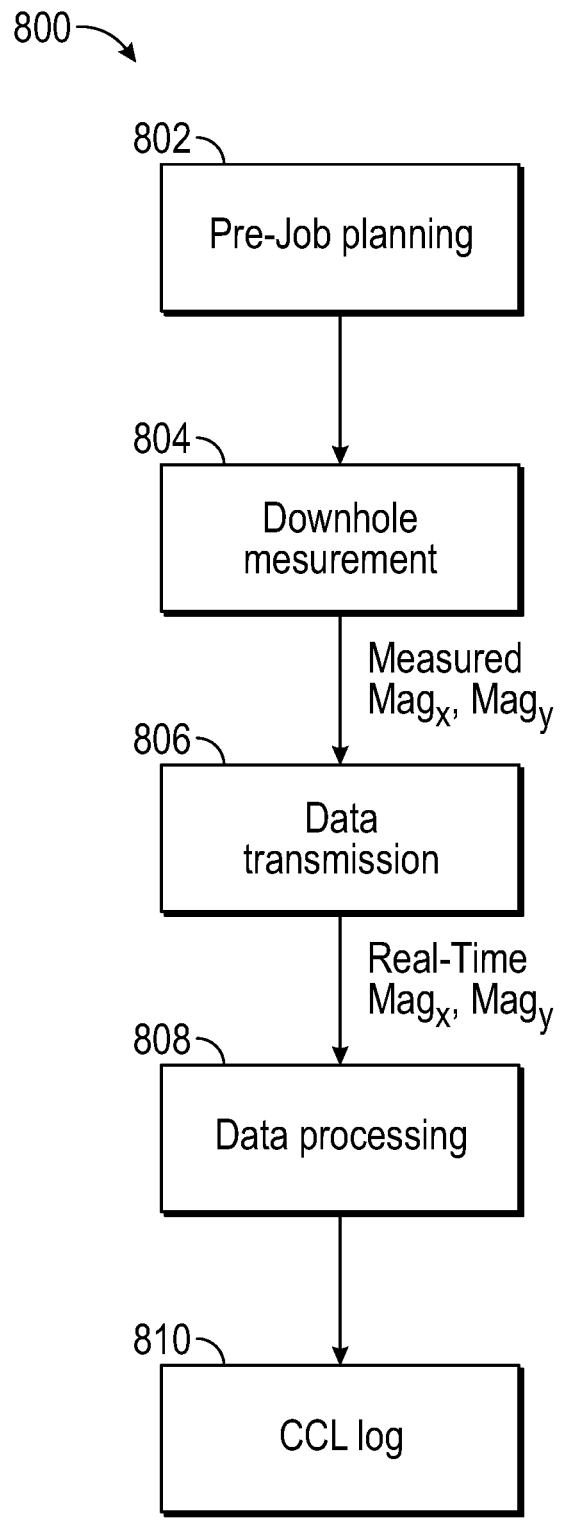
FIG. 8 shows a flowchart for locating a collar in a casing using the methods disclosed herein.

FIG. 8 shows a flowchart 800 for locating a collar in a casing using the methods disclosed herein. In Box 802, a pre-planning stage is performed by running a physical model of the wellbore configuration in order to set parameters by which one can obtain magnetometer measurements for locating the collar. In this stage, the orientation of the wellbore with respect to the Earth's magnetic field can be calculated or determined. The type of downhole tool can be selected based on determine BHA design parameter and optimum operational control parameters (e.g., toolface orientation) can be determined for obtaining data at an optimal quality. In Box 804, in-field data accumulation occurs by operating the downhole tool under the parameters determined in the pre-planning stage of Box 802. For example, the tool can be adjusted to provide stability and to select a suitable sensor-to-casing distance. In another example, the logging rate or run rate of the downhole tool through the casing can be adjusted. In yet another example, the toolface angle can be adjusted. In Box 806, the data is transmitted to a processor or data processing unit. In Box 808, data is interpretation is performed in order to produce a casing collar locator log (CCL Log), as shown in Box 810. In Box 808, the data processing unit may use edge detection algorithms and methods to determine the location of the collar from the magnetometer measurements.

Embodiment 1

A method of locating a collar of a casing of a wellbore, comprising: forming a physical model of a process of obtaining a magnetic measurement of the casing with a sensor conveyed in the wellbore; running a simulation of the physical model to select a design parameter of a tool that includes the sensor, wherein the design parameter of the tool allows for using the sensor at a determined value of an operational parameter for obtaining the measurement at a selected signal-to-noise ratio; conveying the tool in the wellbore; setting the sensor at the determined value of the operational parameter; obtaining the magnetic measurement of the casing using the sensor; and locating the collar using the obtained magnetic measurement.

Embodiment 2

The method of embodiment 1, wherein the physical model includes at least one of: (i) a wellbore configuration parameter; (ii) the design parameter of the tool; (iii) the operational parameter of the sensor; and (iv) a telemetry parameter.

Embodiment 3

The method of embodiment 1, wherein the sensor includes two magnetometers lying in a plane orthogonal to the longitudinal axis of the casing and oriented orthogonally to each other.

Embodiment 4

The method of embodiment 1, wherein locating the collar further comprises determining a presence of a disturbance signal with respect to a DC-offset signal in a magnetic log of the casing obtained by the sensor.

Embodiment 5

The method of embodiment 1, wherein determining the value of the operational parameter further comprises determining the value of the operational parameter at which the sensor obtains magnetic measurements having a selected signal-to-noise ratio.

Embodiment 6

The method of embodiment 1, wherein the signal-to-noise ratio is a ratio of a disturbance signal to a DC-offset signal.

Embodiment 7

The method of embodiment 1, wherein the tool is in the wellbore, further comprising running a simulation of the physical model with a pre-selected design parameter to select the operational parameter for the tool and changing the sensor to the operational parameter.

Embodiment 8

The method of embodiment 7, wherein the operational parameter further comprises at least one of: (i) a stability of the sensor; (ii) a toolface angle of the sensor; (iii) an offset of the sensor; and (iv) a running speed of the sensor.

Embodiment 9

The method of embodiment 1, wherein at least one of the design parameter of the tool and the operational parameter is selected based on a confidence level determined using the physical model for the at least one of the design parameter and the operational parameter.

Embodiment 10

An apparatus for locating a collar of a casing in a wellbore, comprising: a tool string for conveying a sensor through the casing, wherein the sensor is configured to measure a magnetic field; and a processor configured to: form a physical model of a process of obtaining a magnetic measurement of the casing with the sensor, determine, from the physical model, a value of a parameter of the sensor that enables the sensor to obtain a measurement having a selected signal-to-noise ratio, set the parameter of the sensor to the determined value, obtain the magnetic measurement of the casing using the sensor, and locate the collar using the obtained magnetic measurement.

Embodiment 11

The apparatus of embodiment 10, wherein the physical model includes at least one of: (i) a wellbore configuration parameter; (ii) a parameter of a tool that conveys the sensor in the wellbore; (iii) an operational parameter of the sensor; and (iv) a telemetry parameter.

Embodiment 12

The apparatus of embodiment 10, wherein the sensor includes two magnetometers lying in a plane orthogonal to the longitudinal axis of the casing and oriented orthogonally to each other.

Embodiment 13

The apparatus of embodiment 10, wherein the processor is further configured to locate the collar by determining a presence of a disturbance signal with respect to a DC-offset signal in a magnetic log of the casing obtained by the sensor.

Embodiment 14

The apparatus of embodiment 10, wherein the processor determines the value of the parameter to obtain a selected signal-to-noise ratio at the sensor.

Embodiment 15

The apparatus of embodiment 14, wherein the signal-to-noise ratio is a ratio of a disturbance signal to a DC-offset signal.

Embodiment 16

The apparatus of embodiment 10, wherein the sensor is disposed on a pad extendable from the tool string via an arm of the tool string and the processor alters a distance between the sensor and the casing using the arm.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

The invention claimed is:

1. A method of locating a collar of a casing of a wellbore, comprising:
   forming a physical model of a process of obtaining a magnetic measurement of the casing with a sensor conveyed in the wellbore;
   running a simulation of the physical model to select a design parameter of a tool that includes the sensor, wherein the design parameter of the tool allows for using the sensor at a determined value of an operational parameter for obtaining the measurement at a selected signal-to-noise ratio;
   conveying the tool in the wellbore;
   setting the sensor at the determined value of the operational parameter;
   obtaining the magnetic measurement of the casing using the sensor; and
   locating the collar using the obtained magnetic measurement.

2. The method of claim 1, wherein the physical model includes at least one of: (i) a wellbore configuration parameter; (ii) the design parameter of the tool; (iii) the operational parameter of the sensor; and (iv) a telemetry parameter.

3. The method of claim 1, wherein the sensor includes two magnetometers lying in a plane orthogonal to the longitudinal axis of the casing and oriented orthogonally to each other.

4. The method of claim 1, wherein locating the collar further comprises determining a presence of a disturbance signal with respect to a DC-offset signal in a magnetic log of the casing obtained by the sensor.

5. The method of claim 1, wherein determining the value of the operational parameter further comprises determining the value of the operational parameter at which the sensor obtains magnetic measurements having a selected signal-to-noise ratio.

6. The method of claim 1, wherein the signal-to-noise ratio is a ratio of a disturbance signal to a DC-offset signal.

7. The method of claim 1, wherein the tool is in the wellbore, further comprising running a simulation of the physical model with a pre-selected design parameter to select the operational parameter for the tool and changing the sensor to the operational parameter.

8. The method of claim 7, wherein the operational parameter further comprises at least one of: (i) a stability of the sensor; (ii) a toolface angle of the sensor; (iii) an offset of the sensor; and (iv) a running speed of the sensor.

9. The method of claim 1, wherein at least one of the design parameter of the tool and the operational parameter is selected based on a confidence level determined using the physical model for the at least one of the design parameter and the operational parameter.

10. An apparatus for locating a collar of a casing in a wellbore, comprising:
    a tool string for conveying a sensor through the casing, wherein the sensor is configured to measure a magnetic field; and
    a processor configured to:
    form a physical model of a process of obtaining a magnetic measurement of the casing with the sensor,
    determine, from the physical model, a value of a parameter of the sensor that enables the sensor to obtain a measurement having a selected signal-to-noise ratio,
    set the parameter of the sensor to the determined value, obtain the magnetic measurement of the casing using the sensor, and locate the collar using the obtained magnetic measurement.

11. The apparatus of claim 10, wherein the physical model includes at least one of: (i) a wellbore configuration parameter; (ii) a parameter of a tool that conveys the sensor in the wellbore; (iii) an operational parameter of the sensor; and (iv) a telemetry parameter.

12. The apparatus of claim 10, wherein the sensor includes two magnetometers lying in a plane orthogonal to the longitudinal axis of the casing and oriented orthogonally to each other.

13. The apparatus of claim 10, wherein the processor is further configured to locate the collar by determining a presence of a disturbance signal with respect to a DC-offset signal in a magnetic log of the casing obtained by the sensor.

14. The apparatus of claim 10, wherein the processor determines the value of the parameter to obtain a selected signal-to-noise ratio at the sensor.

15. The apparatus of claim 14, wherein the signal-to-noise ratio is a ratio of a disturbance signal to a DC-offset signal.

16. The apparatus of claim 10, wherein the sensor is disposed on a pad extendable from the tool string via an arm of the tool string and the processor alters a distance between the sensor and the casing using the arm.

* * * * *